United States Patent
Haddad et al.

(10) Patent No.: US 7,864,647 B2
(45) Date of Patent: Jan. 4, 2011

(54) METHOD AND APPARATUS FOR OPTIMIZATION OF DATA PULSE DETECTION SLICE LEVEL

(75) Inventors: Bassel Haddad, Haifa (IL); Andrew Popplewell, Manchester (GB)

(73) Assignee: Zoran Corporation, Sunnyvale, CA (US)

( * ) Notice: Subject to any disclaimer, the term of this patent is extended or adjusted under 35 U.S.C. 154(b) by 875 days.

(21) Appl. No.: 11/161,605

(22) Filed: Aug. 9, 2005

(65) Prior Publication Data

US 2007/0047400 A1   Mar. 1, 2007

(51) Int. Cl.
   *G11B 7/00* (2006.01)
(52) U.S. Cl. .................... 369/59.18; 369/59.17
(58) Field of Classification Search ............. 369/59.17, 369/59.18
   See application file for complete search history.

(56) References Cited

U.S. PATENT DOCUMENTS

| | | | |
|---|---|---|---|
| 5,563,863 A | 10/1996 | Hiramatsu | |
| 6,754,157 B2 | 6/2004 | Osada | |
| 6,757,233 B2 | 6/2004 | Akabane et al. | |
| 6,801,488 B2 | 10/2004 | Kato et al. | |
| 2002/0067676 A1 | 6/2002 | Inokuchi et al. | |
| 2002/0105871 A1* | 8/2002 | Akabane et al. | 369/47.35 |
| 2002/0114248 A1 | 8/2002 | Kato et al. | |
| 2002/0114249 A1 | 8/2002 | Kato et al. | |
| 2002/0123862 A1 | 9/2002 | Kato et al. | |
| 2003/0048726 A1* | 3/2003 | Sasa | 369/59.17 |
| 2003/0086357 A1* | 5/2003 | Hikima | 369/124.11 |
| 2003/0185113 A1 | 10/2003 | Hsu et al. | |
| 2004/0114489 A1 | 6/2004 | Li et al. | |
| 2004/0136284 A1* | 7/2004 | Sano et al. | 369/47.17 |
| 2005/0002304 A1 | 1/2005 | Lo et al. | |
| 2006/0182003 A1 | 8/2006 | Kim et al. | |

FOREIGN PATENT DOCUMENTS

| | | |
|---|---|---|
| EP | 1227484 A2 | 7/2002 |
| EP | 1227484 A3 | 7/2002 |
| EP | 1703499 A1 | 9/2006 |

* cited by examiner

*Primary Examiner*—Lixi Chow
(74) *Attorney, Agent, or Firm*—Lando & Anastasi, LLP

(57) ABSTRACT

A method and apparatus for calibrating the slice level of a pulse detector monitors the quality of the detected pulse signal to determine and optimize slice level. The method practiced may include two parts, including a coarse stage and a fine stage. The method practiced may further include a continuous adjustment mode of operation.

15 Claims, 5 Drawing Sheets

METHOD AND APPARATUS FOR OPTIMIZATION OF DATA PULSE DETECTION SLICE LEVEL

BACKGROUND

The present invention relates to reliably and accurately detecting, decoding and recovering data pulses that have been added to a signal. In one particular use, the invention relates to detecting, decoding and recovering structural information which informs a DVD recording system of certain parameters required to effect write operations, such as what laser power level to use and address information identifying location information on the media, wherein the information has been stored in land pre-pits (LPPs). The example of DVD media and LPPs is used herein to provide background and also to illustrate an exemplary embodiment. For the purposes of this application, the terms given in Definition List 1, below, have the meanings given.

| Definition List 1 | |
|---|---|
| Term | Definition |
| Detecting | Identifying signal components representing LPP data and interpreting identified signal components as particular LPP symbols. |
| Decoding | Extracting meaning from detected LPP symbols. |

Information is recorded on a surface of DVD-R/RW media on a track, 100, defined by a spiral groove, 101, bounded by raised areas called lands, 102, 103. (See FIG. 1.) User information is written in the groove, 101, as a series of marks and spaces defined by regions of high and low relative reflectivity. The lands, 102, 103, that bound the grooves include features $R_1$, $R_2$, $R_3$, 104, 105, that represent certain address information and medium-related parameters, such as the power required to read and/or write the user information.

The spiral groove, 101, defined by the lands, 102, 103, follows a spiral path on which is superimposed a substantially sinusoidal, radial wobble ($R_1$, $R_2$, $R_3$, for example) having a constant wavelength, $\lambda$, where $\lambda$ is measured as distance along the track. In systems where the medium rotational speed is controlled to a constant linear velocity along the entire track, the recovered wobble signal has a fixed frequency, which is scaled with the linear velocity. The system uses the wobble as a scale or ruler that represents distances along the track by numbers of cycles of the fixed wavelength, $\lambda$. Thus, read and write clocks and disk rotation speed control may all be derived from the frequency of the recovered sinusoidal wobble signal. For example, in DVD-R/RW media the timing of information within read and write signals is defined by channel bits of duration T, and the wobble wavelength is defined to be 186T. Other media may use other relationships.

In addition, superimposed on the wobble at predetermined, fixed locations relative to the phase of the sinusoidal wobble are microscopic pits formed in the lands during the manufacture of the disk substrate, called land pre-pits (LPP), 104, 105. Conventional DVD-R/RW media sets the locations at 0°+/−10° from peaks (+/−) of the wobble, for example as seen in FIG. 2. Sector synchronization information and other disk specific information is identified by the locations of certain predetermined sequences of LPPs, 104, 105. Short sequences of LPPs, referred to herein as LPP symbols, are defined by the following Table, in which each LPP symbol is comprised of three bits identified as $b_0$, $b_1$, and $b_2$. Here, a "1" indicates that an LPP spike, as defined below, is detected at the location of the indicated bit and a "0" indicates that an LPP spike is not detected at the location of the indicated bit. Sequences of LPP symbols manufactured into the media have more complex meanings.

TABLE

| Definition | $b_2$ | $b_1$ | $b_0$ |
|---|---|---|---|
| EVEN SYNC | 1 | 1 | 1 |
| ODD SYNC | 1 | 1 | 0 |
| Pre-pit DATA ONE | 1 | 0 | 1 |
| Pre-pit DATA ZERO | 1 | 0 | 0 |

The features defining the tracks, including the lands, the grooves and the LPPs may be embossed or otherwise formed on the media together, at the time of manufacture.

The wobble signal is recovered using a four-quadrant photo detector, whose analog signal outputs are then combined algebraically by any suitable analog or digital signal processing to form the radial push-pull signal. While the head is following a track, the radial push-pull signal is the substantially sinusoidal wobble signal, 201. (See FIG. 2.) When the head passes over an LPP, a spike, 202, is superimposed on the substantially sinusoidal wobble signal. LPPs are located at positions, 203, corresponding to peaks of the sinusoidal wobble always having the same polarity (+/−). Thus, the LPP spikes 202 are data pulses added to the underlying wobble signal 201 at particular locations.

The meaning of the sequence of LPPs is determined by detecting LPP symbols comprised of sequences of the presence or absence of the spikes on the wobble signal at particular locations, and decoding the sequence symbols into more complex meanings.

As indicated above, LPP information is embossed or otherwise prerecorded on DVD-R/RW media, other than when a user records data, for example during manufacture. The prerecorded LPP information carries various information used during subsequent recording of user data on the DVD-R/RW media. In order to successfully record user data in a manner permitting subsequent reliable recovery, the LPP spikes must be reliably detected. The amplitudes of the LPP spikes appearing on the wobble signal depend on many factors. The large number of factors which can vary the amplitudes of the LPP spikes tend to make a precise prediction of the average LPP spike amplitude difficult. Among the many factors, one important factor is significant variation in the amplitude of the quadrant photo detector signal output, especially variation in amplitude between different operating modes, such as between reading, erasing and writing operations. Laser power levels are highest during the write operation and lowest during the read operation. Due to the way DVD-RW media behaves while being erased, additional variations occur in optical pickup output as DVD-RW media traverses from the recorded to the erased state.

In order to reliably extract LPP information from the push-pull signal, conventional approaches preset a slice level, 204, using a digital-to-analog converter (DAC). The conventional preset slice level, 204, substantially splits the difference between the peak LPP spike amplitude, 205, and the peak amplitude of the single-frequency sinusoid of the wobble signal, 206, absent the LPP spikes. Assuming an n-bit DAC is used to set the slice level, 204, the slice level, 204, can take on any of $2n$ possible values.

United States Patent Application 2005-0002304, Lo et al., discloses one implementation of the described conventional art, which uses a bottom hold value to deduce a slice level.

U.S. Pat. No. 6,801,488, Kato et al., discloses a method to determine the slice level based on a set of computations related to LPP spike amplitude.

U.S. Pat. No. 6,757,233 discloses opening a gate only in the period during which the amplitude of the wobbling becomes a maximum. LPPs are detected during the gated interval.

SUMMARY

Desired are methods and apparatus that improve the accuracy and reliability of detecting and recovering a data pulse from a signal on which it is superimposed, such as the LPP spike signal superimposed on the track wobble signal used when reading or writing DVD-R media or while reading, writing or erasing DVD-RW media.

Embodiments of aspects of the present invention increase the reliability of LPP signal detection. The LPP slice level can be set in response to the quality with which LPP signal data are detected. A two-part calibration of the slice level can set the slice level to discriminate the LPP signal from the wobble signal on which it is superimposed. The first part of the method can be a coarse calibration that is performed on an as needed basis. The second part of the method can be a fine calibration that refines the result produced by the coarse calibration. The slice level can also be adjusted on a continuous basis, while the media is in use. Embodiments of aspects of the present invention eliminate the need for manually setting the LPP signal slice level for different media, laser power levels and system setups because the coarse and fine calibration parts of the method automatically seek an optimum initial slice level. The resulting LPP slice level calibrated DVD recorder is more reliable both initially and over the lifetime of the product as used by end users.

According to one embodiment of the invention, a method for selecting a slice level optimized for detecting data pulses added to a signal comprises: applying to the signal, a plurality of slice levels in a sequence; detecting data pulses using each of the plurality of slice levels; measuring detected data pulse quality using a first data pulse quality metric; and selecting an initial slice level corresponding to a best measured data pulse quality.

According to another embodiment of the invention, a method for selecting a slice level optimized for detecting data pulses added to a signal comprises: detecting data pulses added to the signal by applying a slice level to the signal; substantially continuously measuring detected data pulse quality, and adjusting the slice level to maximize the detected data pulse quality.

Yet another embodiment includes apparatus for detecting data pulses comprising: an input signal source; a source of a slice level signal, responsive to a slice level control signal input; a comparator having an input receiving the input signal, an input receiving the slice level and an output carrying a raw detected data pulse signal; a data pulse signal decoder receiving the raw detected data pulse signal and producing a detected data pulse signal; and a slice level processor receiving the detected data pulse signal and producing the slice level control signal.

Each of these embodiments can be applied to detecting and recovering LPPs from the wobble signal of DVD media, or to detecting and recovering other data pulse signals superimposed on an underlying signal.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
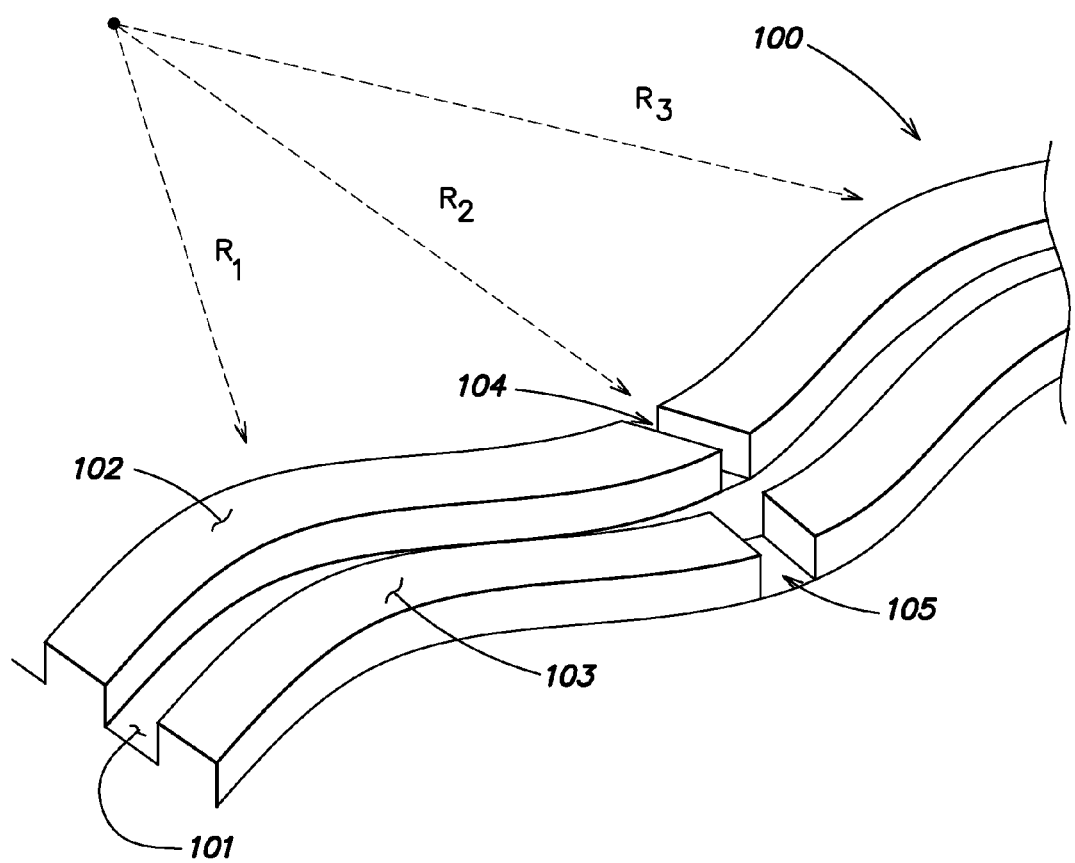
FIG. 1 is a perspective cross-sectional view of a DVD-R/RW track including a wobble and land pre-pits (LPPs)

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

As a preliminary matter, the structure of DVD media is set out here to place the following discussion in context for the reader. While the invention can be used with another source of a signal having data pulses superimposed on it at specific locations, the example of detection of LPP data pulses superimposed on peaks of the wobble signal of DVD media, being one valuable use for aspects of embodiments of the invention, is the illustrated embodiment.

The basic structural unit is a channel bit duration, T. The channel bit duration, T, may interchangeably refer to a time duration with respect to time-domain signals or to a distance in space of signals recorded on or in a tangible medium. Hierarchically, the next level of structure is the frame, which includes 1,488 channel bit durations, i.e., 1,488·T. One LPP symbol is associated with each pair of frames and 26 frames comprise a DVD sector. DVD data is protected by a level of redundancy provided by an error correcting code (ECC) that operates on a structure called an ECC block. Each ECC block includes 16 DVD sectors.

It will be understood from the foregoing that each DVD sector has 13 LPP symbols associated therewith. One LPP symbol will be an LPP sync symbol, while the remaining 12 symbols are LPP data symbols.

A method and apparatus for calibrating the setting of the LPP signal slice level according to an illustrative exemplary embodiment of the invention is now described.

Figure 3:
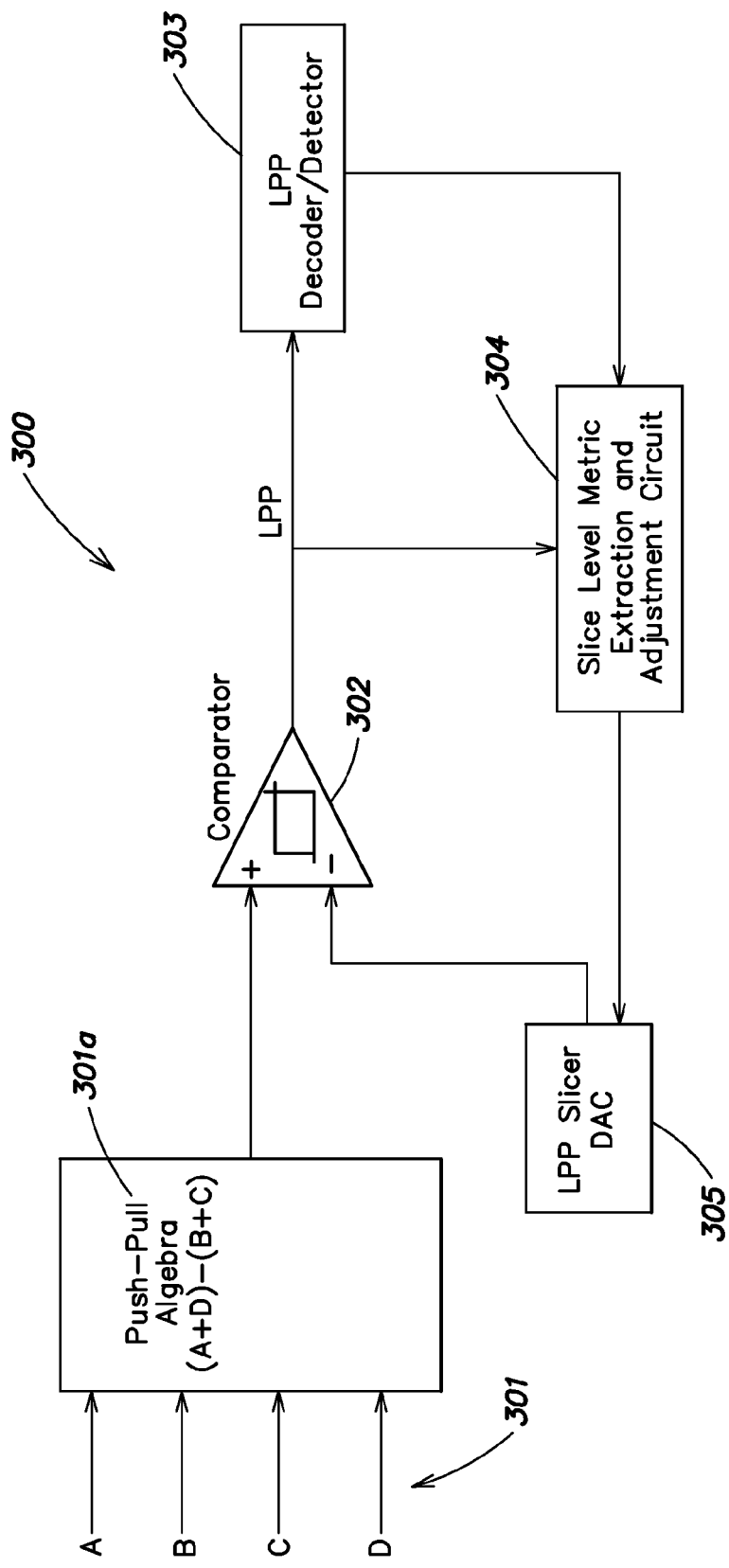
FIG. 3 is a block diagram of a system embodying aspects of the invention.

As shown in FIG. 3, the exemplary apparatus, 300, includes conventional elements, such as an optical pickup head, a four-quadrant photodetector and associated amplifiers resulting in the signals A, B, C, and D, 301, and analog algebraic computation circuits, 301a, which produce a wobble signal, a comparator, 302, an LPP signal decoder, 303, an LPP quality detector, 304, and an LPP slice level digital-to-analog converter (DAC), 305. Other circuits and embodiments using combinations of hardware and software are contemplated as well, for example replacing the analog computation circuits, 301a, with digital circuits or a combination of digital logic and software. This apparatus, 300, is one example of an apparatus suitable for carrying out a method according to embodiments of aspects of the invention. Such an exemplary method is first described.

As noted above, the exemplary calibration method now described includes two parts, a coarse stage and a fine stage. Both stages monitor the quality of the detected LPP signal to determine and optimize the LPP slice level.

During the coarse calibration stage, the LPP symbols are detected. The LPP symbols are observed and the quality with which the LPP symbols have been detected is measured over a plurality of LPP signal slice levels. The measurement of quality during the coarse stage may be, for example, the reliability with which the LPP symbols are detected over a predetermined number, N, of ECC blocks, each including 16 sectors having 13 LPP symbols per sector. In order to measure quality, an accumulator may be initialized to the expected number of LPP symbols, N·16·13, and decremented each time an LPP symbol is successfully detected. At the end of the N ECC blocks, the accumulator should have a low value if the quality level is high, a value of 0 if the LPP symbols are detected perfectly, and a high value if the quality is low. If an illegal LPP symbol or symbol pattern occurs, the accumulator can be incremented, representing that error.

In one embodiment, the LPP slice level DAC is a 6-bit DAC, and the coarse calibration is made on the basis of only eight different slice levels. Because the relationship between the quality of the decoded LPP data and the slice level is expected to be non-linear, the eight slice levels at which the quality measurements are taken should preferably be selected to most clearly discriminate between the quality measured at one slice level versus the quality measured at another, proximate slice level. For the exemplary embodiment of a 6-bit, unsigned DAC having input values ranging from 0 to 63 and eight slice levels, DAC input values of 4, 12, 20, 28, 36, 44, 52 and 60 have been shown to be suitable. These values are evenly spaced, eight levels apart, but other, non-linear spacing could be used. The slice level producing the best quality is selected as a result of the coarse calibration.

The fine calibration stage immediately follows the coarse calibration. Fine calibration adjusts the slice level over a range of values around the result of the coarse calibration. The fine calibration stage adjusts the slice level responsive to a second measure of quality of the detected LPP data. The second measure of quality may be the same as or may differ from the first, used during the coarse calibration stage. As explained in detail, below, the second measure of quality may be a measure of the duty cycle of the detected LPP data, for example, as explained below. The fine calibration stage selects the slice level that produces the best quality measurement of the LPP data signal, e.g. the expected duty cycle for the detected LPP data.

The possible ranges of values around each possible result of the coarse calibration may be selected to be non-overlapping, or may be overlapping with the ranges of values around each other possible result of the coarse calibration. For example, in the exemplary embodiment, where the coarse calibration levels are each exactly eight levels apart, ranges of ±4 levels would be non-overlapping, while ranges of ±5 levels or more would be overlapping. Optionally, the fine calibration stage may use fewer than all of the possible values of slice level for part or all of the process, in order to speed up the process. Also, optionally, if the fine calibration produces a value outside of a predetermined acceptable range, a new coarse calibration may be triggered. The acceptable range might be every value in the range except the two terminal values of the range. In that case, a new coarse calibration might be triggered when the fine calibration produces one of the two extreme values in the range. The acceptable range could also be made smaller, or adjusted heuristically to account for ordinary variation in performance. Alternatively, a new coarse calibration may be triggered periodically, at regular intervals, or according to any other suitable process, including processes that trigger coarse calibration responsive to specific events during use of a DVD, such as a change in the mode of operation of the DVD, for example from reading to writing.

The described aspects of embodiments of the invention are more time-efficient than conventional methods. In order to search all 64 slice levels that can be produced by a 6-bit DAC for the best quality, roughly 64 units of time are required, while the coarse calibration stage requires only roughly eight units of time to accomplish. In the exemplary embodiment given, since non-overlapping ranges of values around each coarse calibration level each include no more than eight different values, the fine calibration stage requires no more than roughly eight units of time. The total time spent on calibration using the described aspects of the present invention is roughly 16 units of time (eight coarse calibration steps, plus up to eight fine calibration steps). Other search schemes will require different numbers of units of time, including more sophisticated schemes requiring greater complexity. By accepting slightly lower initial quality, even faster fine calibration can be achieved, for example, by initially adjusting by larger increments.

A continuous adjustment phase can be used while the DVD media is in use, for reading, writing or erasing after completing both the coarse and fine calibration stages. The continuous adjustment phase operates in an approximately similar fashion to the fine calibration stage, the particulars of continuous adjustment being hereinafter described. Continuous adjustment starts from the current DAC slice level. The system then adjusts the slice level over a range of values around the starting point. The continuous adjustment phase adjusts the slice level responsive to either the fine calibration measure of quality of the detected LPP data or a third measure of quality of the detected LPP data. The measure of quality used for continuous adjustment should indicate the direction which a correction to the slice level should take, so that changes made by the continuous adjustment always result in improvements to the setting of the DAC slice level. The measure of quality used in this continuous adjustment phase may advantageously be a measure of the duty cycle of the detected LPP data, as next explained. The continuous adjustment phase selects the slice level that produces the best quality measurement of the LPP data signal, e.g. the expected duty cycle for the detected LPP data, as now explained.

The measurement of LPP data quality should occur at a point in signal processing after the LPP data has been at least partially detected, or after the LPP data has been substantially completely detected. This point, at which the LPP data signal quality is measured may, however, occur prior to decoding the meaning of the LPP data. One exemplary measure of LPP data quality useful for establishing an appropriate LPP slice level is the duty cycle of the LPP data signal. The LPP data signal is a bi-level signal having a de-asserted level and an asserted level. The LPP data is represented as pulses having the asserted level for a period of time during which the LPP spike exceeds the LPP slice level. The duty cycle of the LPP data signal is a ratio of the time during which the signal is at the asserted level relative to the time during which the measurement is taken. Duty cycle is a good measure of quality because it is a sensitive indicator of whether LPP spikes are missed due to too high an LPP slice level, whether extra LPP "spikes" are caught that are actually noise on the wobble signal, or whether the LPP slice level is well-positioned for accurate detection and recovery of the LPP spikes. That is, the measurement of the duty cycle of the LPP data signal not only identifies whether the LPP slice level has been set to an optimal level, but also identifies the direction in which the LPP slice level needs to be adjusted when the LPP slice level is determined to be sub-optimal. An alternative to duty cycle is a measurement of the width of each LPP data pulse as compared to an expected width.

Over a window of time long enough to span many LPPs, the LPP data duty cycle can be readily measured or calculated. The duty cycle is a function of the number of LPP pulses observed or expected in the window, the width of each LPP pulse observed or expected, and the length of the window.

An average number of LPP pulses expected is easily calculated. An example of this calculation is now explained in connection with DVD-R/RW media.

In accordance with DVD-R/RW standard, as explained above, each DVD sector has 26 data frames. Each data frame includes 1,488 bits and each pair of data frames (i.e., every two-frame sequence) includes one LPP symbol. Thus, each DVD sector includes 13 LPP symbols along with the data bits stored therein. Each LPP symbol includes one, two or three pulses representing the values of the three LPP bits ($b_0$, $b_1$, and $b_2$).

Given the foregoing basic DVD-R/RW format parameters, upper and lower bounds for the number of LPP pulses expected over an interval can be derived. The maximum number of LPP pulses expected occurs when an LPP even sync symbol, including three asserted LPP bits, is followed by 12 LPP data one symbols, each including two asserted bits. The minimum number of LPP pulses expected occurs when an LPP odd sync symbol, including two asserted LPP bits, is followed by 12 LPP data zero symbols, each having a single asserted LPP bit. Moreover, for a wide range of media, made by several different manufacturers, upper and lower bounds for the LPP pulse width can be measured and lower and upper bound pulse widths may be empirically determined that are bounded by $PW_{low}$ and $PW_{high}$, where $PW_{low}$ is the average duration of the LPP pulses observed, in channel bits, during a measurement of the medium having the lowest pulse width, $PW_{high}$ is the average duration of the LPP pulses observed, in channel bits, during a measurement of the medium having the highest pulse width and T is the channel bit duration.

Figure 4:
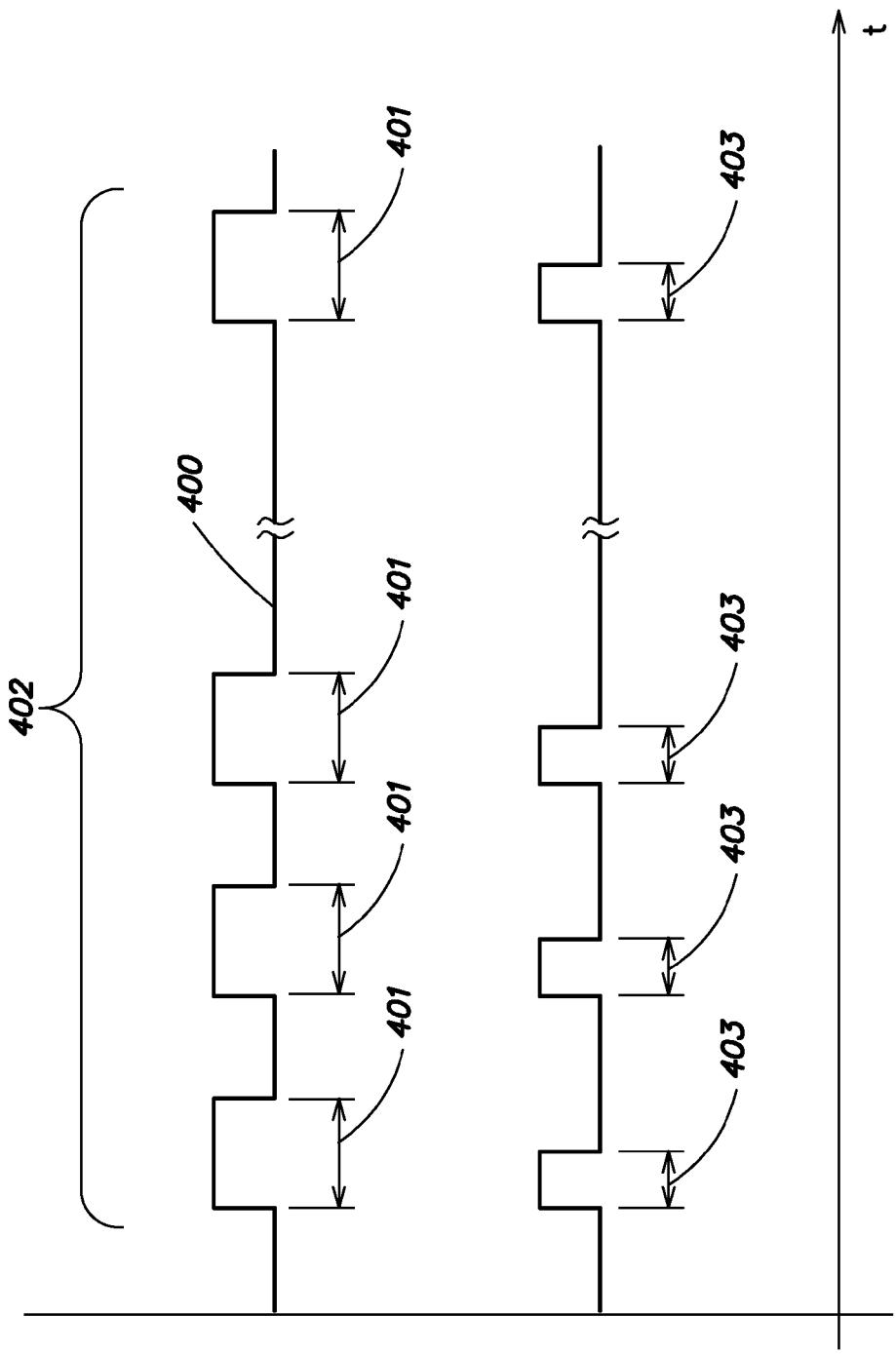
FIG. 4 is a waveform plot of a detected LPP signal showing a difference in duty cycle between the detected LPP signal and an expected LPP signal.

The quality measurement, according to this aspect of an embodiment of the invention, is a comparison between the measured duty cycle of the LPP data signal, 400, and the expected duty cycle of the LPP data signal. (See FIG. 4.) The duty cycle may be calculated for LPP data signal, 400, by computing the sum of all LPP pulse widths, 401, observed during an interval, 402, divided by the duration of the interval, 402. The expected duty cycle may be calculated by multiplying an expected number of LPP pulses by the expected LPP pulse width, 403, and then dividing by the duration of the interval. The expected number of LPP pulses during an interval may be taken to be the computed maximum number of LPP pulses, the computed minimum number of LPP pulses, an average of the maximum and minimum numbers of LPP pulses or some other intermediate value. Likewise, the expected LPP pulse width may be computed as either the upper LPP pulse width, $PW_{high}$, the lower LPP pulse width $PW_{low}$, or some intermediate value.

The exemplary embodiment of some aspects of the present invention responds to the difference between the measured LPP duty cycle and the expected duty cycle by changing the LPP slice level. If a higher than expected LPP duty cycle is observed, then the slice level is lower than the optimum level and the slice level would be raised. Alternatively, if a lower than expected LPP duty cycle is observed, then the slice level is higher than the optimum level and the slice level would be lowered.

Figure 5:
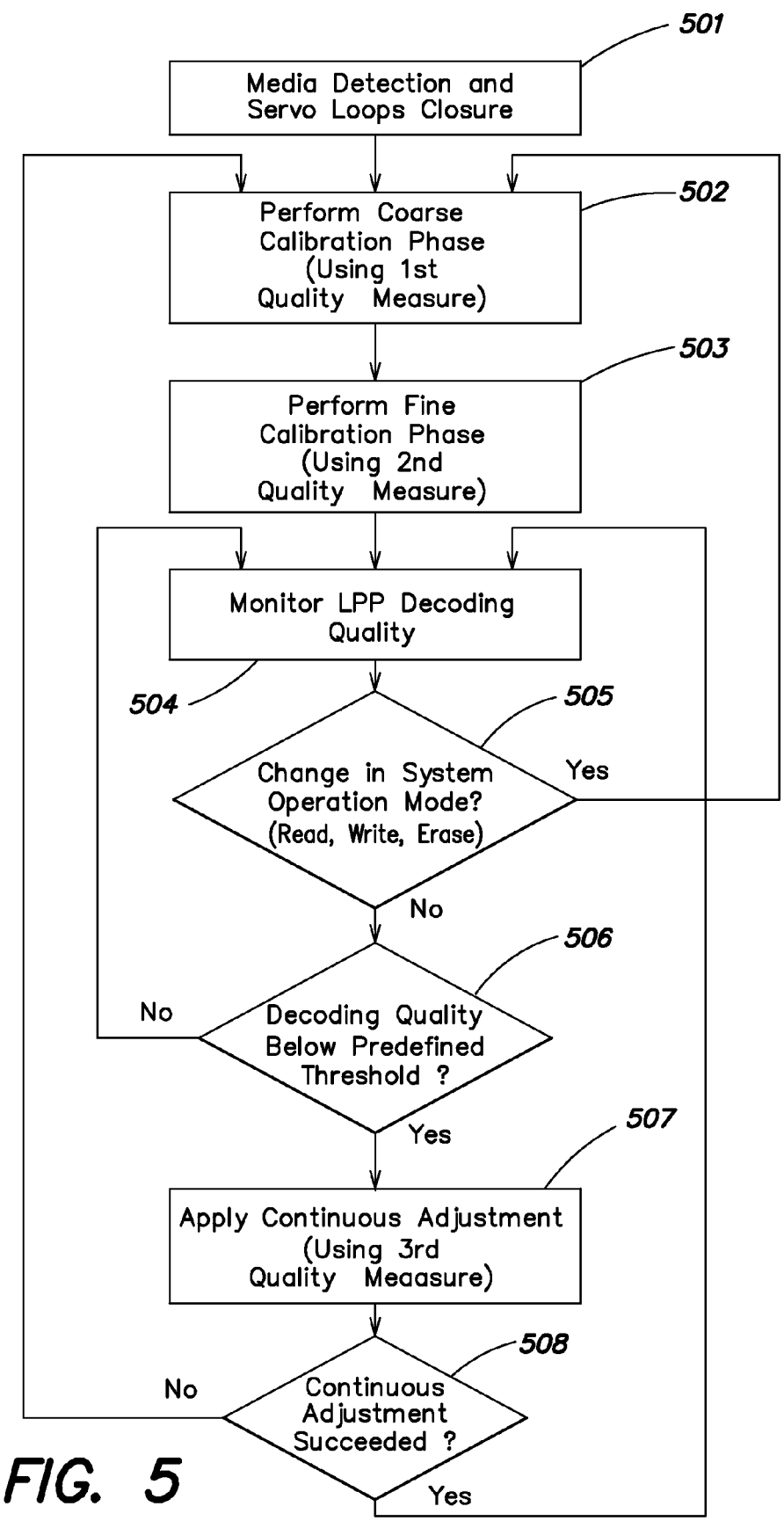
FIG. 5 is a flow diagram of a method embodying aspects of the invention that may be practiced, for example, using the system of FIG. 3.

An exemplary method according to aspects of an embodiment of the invention described above is summarized in the flow diagram of FIG. 5, which is now described.

First, the system locks onto and detects a wobble signal, step 501. Then coarse and fine calibration phases are performed, steps 502 and 503.

The coarse calibration phase, step 502, is performed using a first quality measure to determine the quality of LPP pulses detected. As described, several coarse set-points are checked to identify that set-point which produces the highest quality detected LPP pulses.

The fine calibration phase, step 503, is performed using a second quality measure to determine the quality of LPP pulses detected. As described, several fine set-points are checked to identify that set-point which produces the optimum quality detected LPP pulses. The second quality measure may optionally be the same as the first quality measure, or may be a different quality measure. The second quality measure may optionally include together with a quality indication, an indication of whether the optimum set-point is above or below the most recently measured set-point.

Once calibration is complete, the system begins monitoring LPP decoding quality, step 504. The system also monitors its own operational mode, i.e., whether the system is reading, writing or erasing media, step 505, for changes. If a change to operational mode occurs, then the system will perform the calibration method again, steps 502, 503, and 504. If no change to the operational mode occurs, then the system will respond to the monitored (step 504), decoded LPP quality, step 506. If the decoded LPP quality is acceptable, then monitoring continues, steps 504, 505, and 506.

If the decoded LPP quality is not acceptable, step 506, then continuous adjustment, described above, is performed, step 507. Continuous adjustment uses a quality measure that indicates both the quality with which LPP detection occurs, and the direction in which the LPP slice level should be moved to improve quality, so as to prevent changing LPP slice level in a direction that would detract from performance. The result of the continuous adjustment is checked, step 508, and if successful, monitoring resumes, step 504; if unsuccessful, calibration is again undertaken, step 502.

The foregoing method of operation is carried out by the system depicted in FIG. 3, as noted above. The operation of that system is now described.

Figure 2:
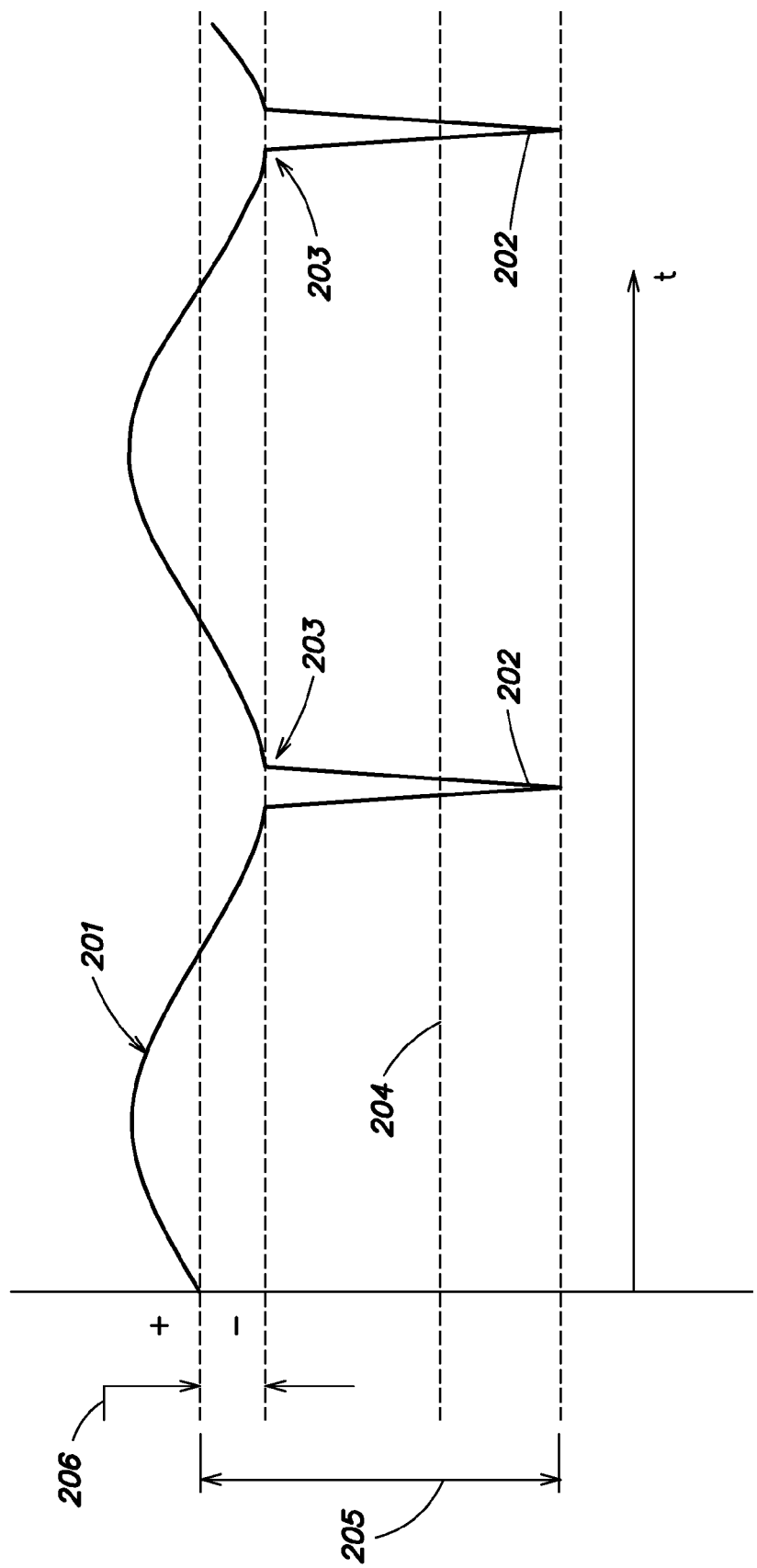
FIG. 2 is a waveform plot of a wobble signal including LPP spikes.

A four-optical pickup head produces four signals, A, B, C and D, which are inputs to a computational logic block, 301*a*. The computational logic block, 301*a*, performs the algebraic computation that yields as a result a signal representing (A+D) minus (B+C). The computed signal is the wobble signal including superimposed thereon the LPP spikes. (See FIG. 2, 201, 202.) The wobble signal with the LPP spikes superimposed thereon is one input to a comparator, 302. A second input to the comparator, 302, is the LPP slice level, which is an output of the LPP slice level DAC, 305. The output of the comparator, 302, is the detected LPP data signal. The LPP data signal is a stream of LPP data pulses having positions and widths determined by the amplitude intersection between the wobble signal with the LPP spikes superimposed thereon and the LPP slice level. (See FIG. 4, 400.) The LPP data signal is decoded by an LPP decoder, 303. One output of the LPP decoder, 303, may be timing information from which a slice level metric extraction and adjustment circuit, 304, can determine the LPP data signal duty cycle. The slice level metric extraction and adjustment circuit adjusts the LPP slice level up or down by applying a suitable digital signal to the LPP slice level DAC, 305. During a coarse stage, the apparatus searches a list of slice levels for the best quality of the detected LPP symbols by a first quality measure, and during the fine stage, the apparatus adjusts the slice level within a range of the coarse setting responsive to a second quality measure, so as to optimize the quality of the detected LPP symbols before performing reading and writing operations. During continuous calibration, as described above, the apparatus adjusts the slice level within a range of the most recent setting responsive to a quality measure that also indicates the direction of any error, so as to continuously optimize the quality of the detected LPP symbols during reading and writing operations.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for selecting a slice level optimized for detecting data pulses superimposed on a signal during operational activities reliant on the detected data pulses, where the data pulses are taken as ordered groups that define data symbols representing multi-bit, predetermined data, the method comprising:
    performing a coarse calibration of:
        applying to the signal, a plurality of slice levels in a sequence;
        detecting data pulses using each of the plurality of slice levels;
        assembling a plurality of the detected data pulses into an ordered group defining one of the data symbols;
        decoding data represented by the data symbol defined by the ordered group assembled;
        measuring detected data pulse quality by comparing expected data and the decoded data, producing a measured data pulse quality reflecting data decoded; and
        selecting as the slice level an initial slice level corresponding to a best measured data pulse quality; and
    continuously monitoring and optimizing as the slice level one or more next slice levels during the operational activities by:
        measuring detected data pulse shape as defined by amplitude and time, producing a continuous detected data pulse quality reflecting a fine measure of the slice level optimization to correctly detect data pulses and in which direction a correction to the slice level should be applied to produce the one or more next slice levels; and
        adjusting the slice level around the initial slice level to produce the one or more next slice levels so as to maximize continuous detected data pulse quality.

2. The method of claim 1, wherein the signal is a DVD wobble signal and the data pulses represent LPP data.

3. The method of claim 2, wherein measuring detected data pulse quality using a first detected data pulse quality metric includes determining a number of detected LPP symbols over a predetermined period of time.

4. The method of claim 3, further comprising:
    comparing the number of detected LPP symbols to an expected number of LPP symbols over the period of time.

5. The method of claim 1, further comprising:
    performing a fine calibration before continuously monitoring and optimizing, using a second metric different from the measured data pulse quality reflecting data decoded.

6. The method of claim 5, wherein the fine calibration using the second metric includes measuring a duty cycle of detected data pulses.

7. The method of claim 5, wherein the fine calibration using a second quality metric is performed at a plurality of slice levels around the initial slice level.

8. The method of claim 1, wherein the measured data pulse quality comprises:
    an error rate for the decoded data.

9. The method of claim 1, wherein measuring detected data pulse shape includes measuring a pulse width of detected data pulses.

10. A method for selecting a slice level optimized for detecting data pulses superimposed on a signal, where the data pulses are taken as ordered groups that define data symbols representing multi-bit, predetermined data, comprising:
    detecting data pulses added to the signal by applying a slice level to the signal;
    assembling the detected data pulses into an ordered group defining one of the data symbols;
    decoding data represented by data symbol defined by the ordered group assembled;
    measuring detected data pulse quality, by:
        initially measuring error rate of decoded data, as an inverse measure of decoded data quality at a plurality of predetermined slice levels, and
        initially selecting as the slice level one of the plurality of predetermined slice levels corresponding to a best decoded data quality; and
    substantially continuously adjusting as the slice level to one or more next slice levels to maximize the detected data pulse quality metric by:
        substantially continuously measuring a data pulse shape as defined by amplitude and time over a range of predetermined slice levels near the initially selected slice level and selecting the slice level to produce the one or more next slice levels so as to maximize a detected data pulse quality reflecting a fine measure of the slice level optimization to correctly detect data pulses and in which direction a correction to the slice level should be applied to produce the one or more next slice levels.

11. The method of claim 10, further comprising again measuring detected data pulse quality at the plurality of predetermined slice levels when substantially continuously measuring a data pulse shape does not produce an optimum data pulse quality.

12. The method of claim 11, wherein continuously measuring data pulse shape further comprises:
    measuring detected data pulse duty cycle; and
    adjusting the slice level up when a higher measured detected data pulse duty cycle than expected occurs and down when a lower measured detected data pulse duty cycle than expected occurs.

13. The method of claim 12, wherein the data pulse represents LPP data and the signal is a DVD wobble signal.

14. The method of claim 11, wherein substantially continuously measuring further comprises:

measuring a detected data pulse width; and adjusting the slice level up when a higher measured detected data pulse width than expected occurs and down when a lower measured detected data pulse width than expected occurs.

15. Apparatus for detecting data pulses comprising:

an input signal source;

a source of a slice level signal, responsive to a slice level control signal input;

a comparator having an input receiving the input signal, an input receiving the slice level and an output carrying a raw detected data pulse signal;

a data pulse signal detector receiving the raw detected data pulse signal and producing an ordered group of data pulses that define a data symbol representing multi-bit, predetermined data;

a data symbol decoder producing decoded data; and a slice level processor receiving the fully detected data pulse signal and producing the slice level control signal including a duty cycle detector receiving the fully detected data pulse signal, a data error rate detector receiving the decoded data and an output circuit that varies the slice level control signal in a magnitude and direction responsive to a comparison between an expected duty cycle and an output of the duty cycle detector and further varies the slice level control signal responsive to the data error rate detector.

* * * * *